(12) United States Patent
Sheridan

(10) Patent No.: US 10,779,681 B2
(45) Date of Patent: *Sep. 22, 2020

(54) DECORATIVE GRILL DECAL AND METHOD OF USE

(71) Applicant: James T. Sheridan, Litchfield, ME (US)

(72) Inventor: James T. Sheridan, Litchfield, ME (US)

(*) Notice: Subject to any disclaimer, the term of this patent is extended or adjusted under 35 U.S.C. 154(b) by 38 days.

This patent is subject to a terminal disclaimer.

(21) Appl. No.: 16/035,386

(22) Filed: Jul. 13, 2018

(65) Prior Publication Data

US 2018/0325315 A1 Nov. 15, 2018

Related U.S. Application Data

(63) Continuation-in-part of application No. 15/183,467, filed on Jun. 15, 2016, now Pat. No. 10,045,662.

(Continued)

(51) Int. Cl.
*A47J 37/07* (2006.01)
*B32B 27/30* (2006.01)
(Continued)

(52) U.S. Cl.
CPC .......... *A47J 37/0786* (2013.01); *B32B 7/12* (2013.01); *B32B 15/04* (2013.01); *B32B 15/20* (2013.01); *B32B 27/06* (2013.01); *B32B 27/281* (2013.01); *B32B 27/30* (2013.01); *B32B 27/304* (2013.01); *B32B 27/322* (2013.01); *B32B 27/36* (2013.01); *B32B 37/12* (2013.01); *B32B 37/18* (2013.01); *B32B 37/182* (2013.01); *B32B 38/162* (2013.01); *A47J 37/07* (2013.01);
(Continued)

(58) Field of Classification Search
CPC ....... B32B 15/04; B32B 27/322; B32B 27/36; B32B 24/30; B32B 27/304; B32B 27/281; B32B 27/06; B32B 7/12; B32B 7/06; B32B 15/20; B32B 2333/00; B32B 2379/08; B32B 2451/00; B32B 2307/714; B32B 2307/306; B32B 2311/24; B32B 2367/00; B32B 2307/412; B32B 2307/41; B32B 2307/712; B32B 2307/748; B32B 2307/4023; B32B 2307/71; B32B 2307/75; B32B 2509/00; B32B 2327/06; B32B 2327/18; B29C 63/0095; B29C 63/0017; B29C 63/02; B29C 63/0047; C09J 7/29; C09J 2467/006; C09J 2427/006; C09J 2400/163; C09J 2479/086; A47J 37/0786; B29L 2031/762; B29K 2995/0016; B29K 2995/0055
See application file for complete search history.

(56) References Cited

U.S. PATENT DOCUMENTS 4,666,762 A 5/1987 Yamamoto
6,458,464 B1 10/2002 Takeda
(Continued)

*Primary Examiner* — Patricia L. Nordmeyer
(74) *Attorney, Agent, or Firm* — Anthony D. Pellegrini

(57) ABSTRACT

A decorative decal for altering the aesthetics of a barbeque grill, with the decal comprising a flexible and heat resistant substrate having a visually discernible aesthetic element on its first surface and a smooth non-porous second surface, with the second surface suitable for attaching the substrate to the outer surface of the barbeque grill by use of static cling; and a method of use of the decal.

15 Claims, 7 Drawing Sheets

Related U.S. Application Data

(60) Provisional application No. 62/285,061, filed on Oct. 19, 2015.

(51) Int. Cl.
| | | |
|---|---|---|
| | *B32B 27/32* | (2006.01) |
| | *B32B 27/36* | (2006.01) |
| | *B32B 15/20* | (2006.01) |
| | *B32B 27/06* | (2006.01) |
| | *B32B 15/04* | (2006.01) |
| | *B32B 37/12* | (2006.01) |
| | *B32B 37/18* | (2006.01) |
| | *B32B 7/12* | (2006.01) |
| | *B32B 38/16* | (2006.01) |
| | *B32B 27/28* | (2006.01) |

(52) U.S. Cl.
CPC ..... *B32B 2255/10* (2013.01); *B32B 2255/205* (2013.01); *B32B 2307/306* (2013.01); *B32B 2307/71* (2013.01); *B32B 2307/712* (2013.01); *B32B 2307/714* (2013.01); *B32B 2311/24* (2013.01); *B32B 2327/06* (2013.01); *B32B 2327/18* (2013.01); *B32B 2333/00* (2013.01); *B32B 2367/00* (2013.01); *B32B 2379/08* (2013.01); *B32B 2509/00* (2013.01)

(56) References Cited

U.S. PATENT DOCUMENTS

2003/0208888 A1* 11/2003 Fearing .............. A44B 18/0003
　　　　　　　　　　　　　　　　　　　　　24/442
2015/0144238 A1　　5/2015 Traeger

* cited by examiner

DECORATIVE GRILL DECAL AND METHOD OF USE

CROSS REFERENCE TO RELATED APPLICATIONS

This application claims priority to a non-provisional application, U.S. Ser. No. 15/183,467, filed Jun. 15, 2016, entitled "Decorative Grill Decal And Method Of Use", by James T. Sheridan, which is hereby incorporated by reference; and to a provisional application, U.S. Ser. No. 62/285,061, filed Oct. 19, 2015 and now expired, entitled "Process Of Making A Graphic Decal For A BBQ Grill, Decal Made Thereby, Kit Of Components For The Use Of A Decal, Sticker, Or Film To Decorate Or Change The Cosmetic/Physical/Visual Appearance Of A BBQ Grill (Charcoal, Propane, LP Gas, Electric, Etc.)", by James T. Sheridan, which is hereby incorporated by reference.

BACKGROUND OF THE INVENTION

The present invention relates to the field of outdoor cooking appliances, namely, barbeque grills, and more particularly to decorative decals adapted for changing the aesthetic appearance of barbeque grills.

Barbecue grills are common sights across America, especially during the summer months, but even year round. Designed to cook with an open flame, barbeque grills must be used outdoors to prevent harmful smoke and other toxins from entering indoor living spaces, and are often left outdoors even when not in use, thus being exposed to environmental elements. These include weather related elements (sunlight, heat, cold, rain, snow, hail, sleet, etc.), animal related elements (bird and insect excrement, etc.), and plant related elements (sap, pitch, leaves, etc.). As a result, barbeque grills are typically constructed of metal, such as stainless steel or aluminum, in order to withstand these environmental elements, as well as the heat generated during operation, which can be as much as 600 degrees Fahrenheit or even higher.

While some manufacturers provide different color treatments for their barbeque grills, most barbeque grills have a very similar aesthetic appearance to each other, even across models, makes, and brands. Individuals, however, often desire to personalize their possessions, and barbeque grills are no exception. There is a lack in the industry of easy decorative means for changing the aesthetics of a barbeque grill.

It is therefore shown that there is a need for a means for altering the aesthetics of a barbeque grill.

It is thus an object of the present invention to provide a decorative decal suitable for being affixed to the outer surface of a barbeque grill.

It is a further object of the present invention to provide a decorative decal having a visually discernible aesthetic element.

It is yet a further object of the present invention to provide a decorative decal being suitable to withstand the heat of operation of the barbeque grill.

It is yet a further object of the present invention to provide a decorative decal being suitable to withstand the environmental elements to which a barbeque grill is typically exposed.

It is yet a further object of the present invention to provide a method for using the decorative decal of the present invention.

Other objects of the present invention will be readily apparent from the description that follows.

SUMMARY OF THE INVENTION

The present invention discloses a decorative decal having a visually discernible aesthetic element on one side and a smooth, non-porous surface on the other side. The visually discernible aesthetic element is any aesthetically pleasing representation of graphics, designs, and/or text. The decal is applied to the outer surface of a barbeque grill, including but not limited to the grill hood and/or the grill doors, and retained thereon by the static cling. The decal itself is comprised of multiple layers, with a flexible heat resistant substrate having a core and layers on the outer surface of the substrate for receiving ink and for over-laying the printed image.

The present invention also discloses a method of use of the decal, including some or all of the steps of obtaining a decorative decal as described above; cleaning the outer surface of the barbeque grill in preparation for applying the decorative decal thereto; removing one or more handles (if any) from the barbeque grill; removing a temperature gauge (if any) from the barbeque grill; placing the decorative decal onto the outer surface of the barbeque grill such that the decal's smooth, non-porous surface is in direct contact with the outer surface of the barbeque grill and retains the decal thereupon; re-attaching the one or more handles (if any) to the barbeque grill; and re-attaching the temperature gauge (if any) to the barbeque grill. Multiple decorative decals may be used in the foregoing method to achieve the desired alteration of the aesthetics of the barbeque grill. In an alternative embodiment, the decal may have an adhesive on the side facing the grill, whereby the decal is retained onto the grill by said adhesive.

Other features and advantages of the decorative decal and method of the present invention are described below.

DESCRIPTION OF THE DRAWINGS

FIG. 7A depicts Step A (obtain a decal); FIG. 7B depicts Step A2 (remove the grill handle); FIG. 7C depicts Step A3 (remove the grill temperature gauge); FIG. 7D depicts Step A1 (clean the grill); FIG. 7E depicts Step A2 (apply the decal to the grill); FIG. 7F depicts Step B2 (reattach the grill handle); and FIG. 7G depicts Step B3 (reattach the grill temperature gauge).

DETAILED DESCRIPTION OF THE INVENTION

Figure 1:
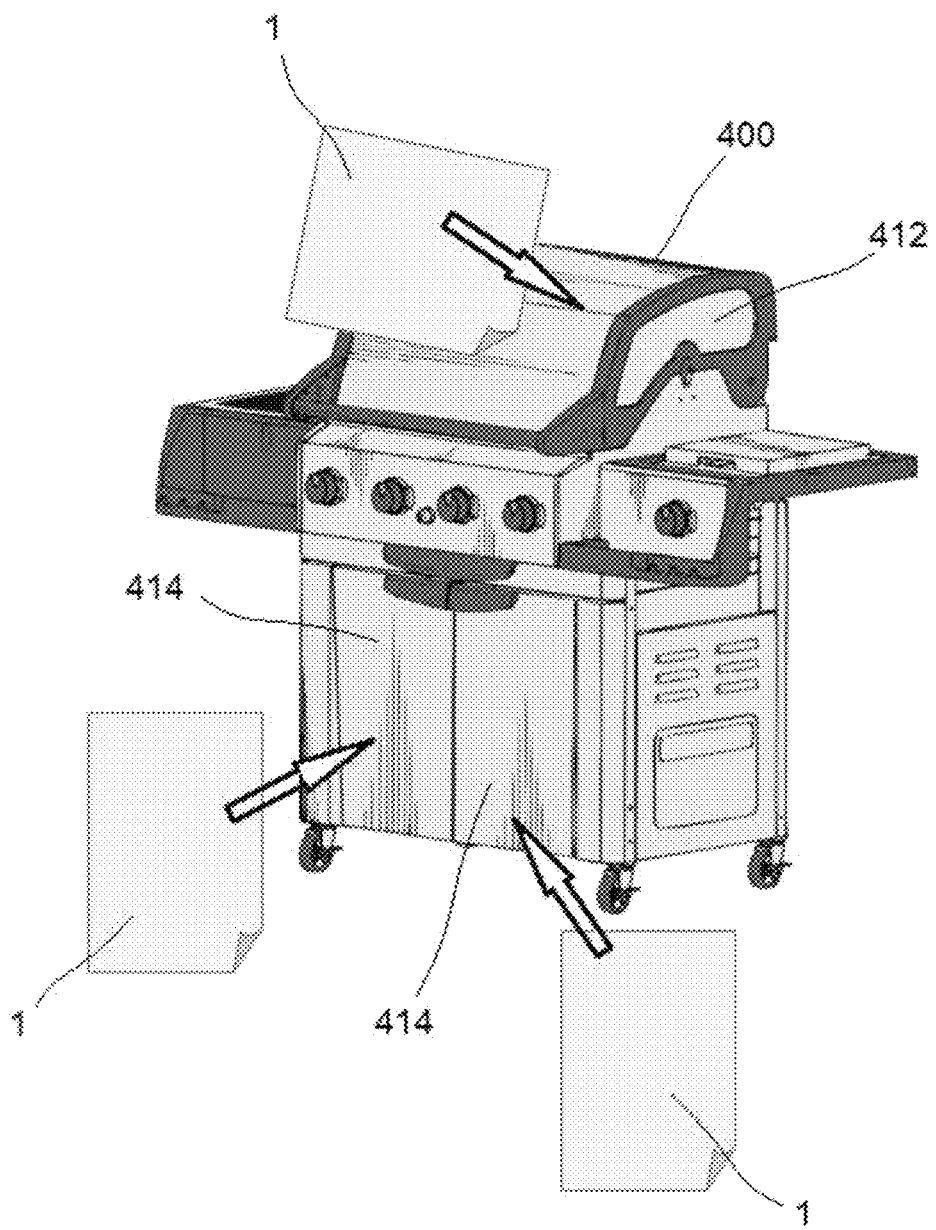
FIG. 1 is a perspective view of a typical barbeque grill together with a plurality of decals, with arrows indicating where the decals will be placed onto the surface of the barbeque grill.
Figure 3:
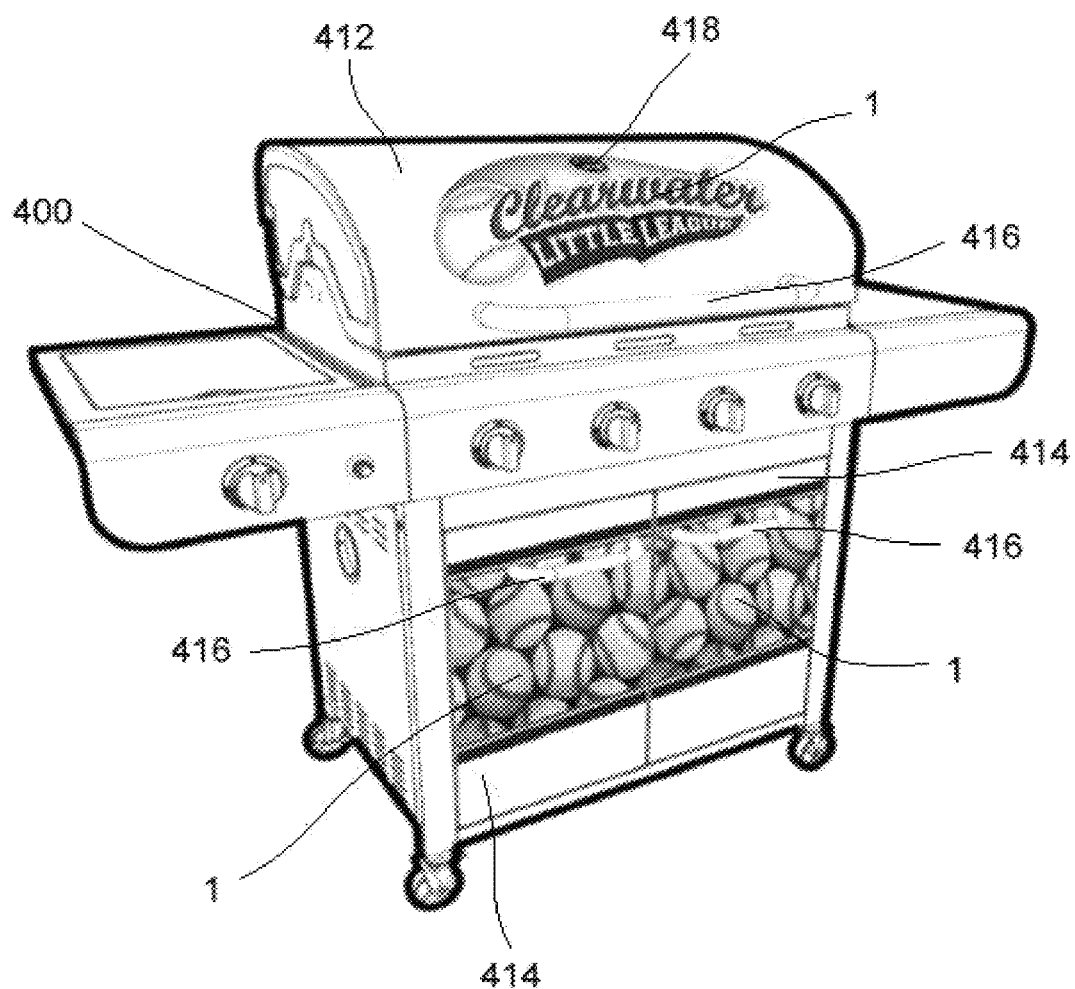
FIG. 3 is a perspective view of a barbeque grill with a decal affixed to the grill hood and a pair of decals affixed to the grill doors. The visually discernible aesthetic elements in this figure comprise sports-themed images, including graphics and text.

The present invention discloses a decorative decal 1 useful for altering the aesthetics of a typical barbeque grill 400, as well as a method for use of the decal 1. The barbeque grill 400 may have a hood 412, one or more doors 414, one or more handles 416 on the hood 412, one or more handles 416 on each door 414, and a temperature gauge 418. See FIGS. 1 and 3. Other objects that have surfaces that can become very hot, such as wood stoves, boilers, water heaters, and the like, can also have their aesthetics altered using the decal 1 of the present invention.

Figure 4A:
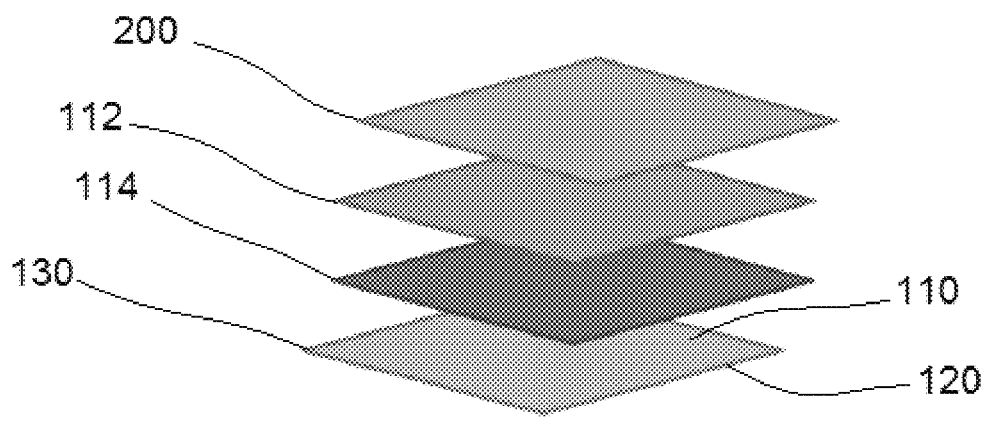
FIG. 4A is a partial exploded view of the decal of the present invention, with the various layers comprising the substrate shown separated from each other.
Figure 4B:
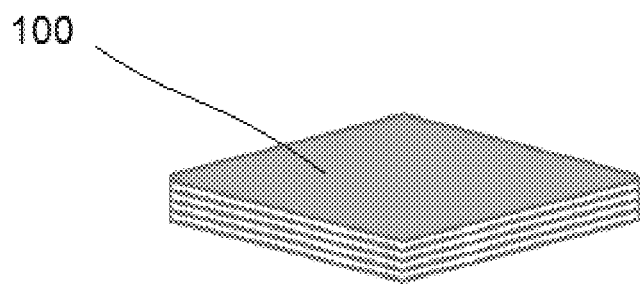
FIG. 4B is a partial perspective view of the decal depicted in FIG. 4A, with the various layers comprising the substrate shown affixed to each other.

The decal 1 of the present invention comprises at least a substrate 100. See FIGS. 4A and 4B. The substrate 100 must be substantially flexible and resistant to heat up to at least 200 degrees Fahrenheit. In alternative embodiments the substrate 100 must be resistant to heat up to at least 500 degrees Fahrenheit. The substrate 100 has a first surface 110 and a second surface 120. A visually discernible aesthetic element 112 is on the first surface 110. The second surface 120 of the substrate 100 is smooth and non-porous such that when the decal 1 is placed onto the outer surface 410 of the barbeque grill 400 such that the second surface 120 of the substrate 100 is in direct contact therewith, the decal 1 adheres thereto by cohesive forces that exist between the smooth non-porous second surface 120 of the substrate 100 and the outer surface 410 of the barbeque grill 400, a phenomenon commonly known as "static cling". The decal 1 is placed onto the outer surface 410 of the barbeque grill 400 such that the second surface 120 of the substrate 100 is in contact with the outer surface 410 of the barbeque grill 400, with the first surface 110 of the substrate 100 facing outward from the outer surface 410 of the barbeque grill 400. Due to the use of "static cling" to retain the decal 1 onto the barbeque grill 400, the decal 1 can be easily removed from or repositioned onto the barbeque grill 400. In an alternative embodiment, the decal 1 may have an adhesive layered onto the second surface 120 of the substrate 100, said adhesive being suitable for attaching the substrate 100 to the outer surface 410 of the barbeque grill 400.

In the preferred embodiment of the present invention, the substrate 100 comprises a core 130 located between its first and second surfaces 110,120. See FIGS. 4A and 4B. The core 130 of the substrate 100 may be comprised of polyimide, vinyl, PTFE, PVC, polyester, or flexible aluminum sheeting, such as XF-803® aluminum label material made by Polyonics, Inc. Other materials may also be used, provided they are sufficiently flexible and sufficiently heat resistant, and can bear a visually discernible aesthetic element 112 on the first surface 110 and is smooth and non-porous on the second surface 120.

Figure 2:
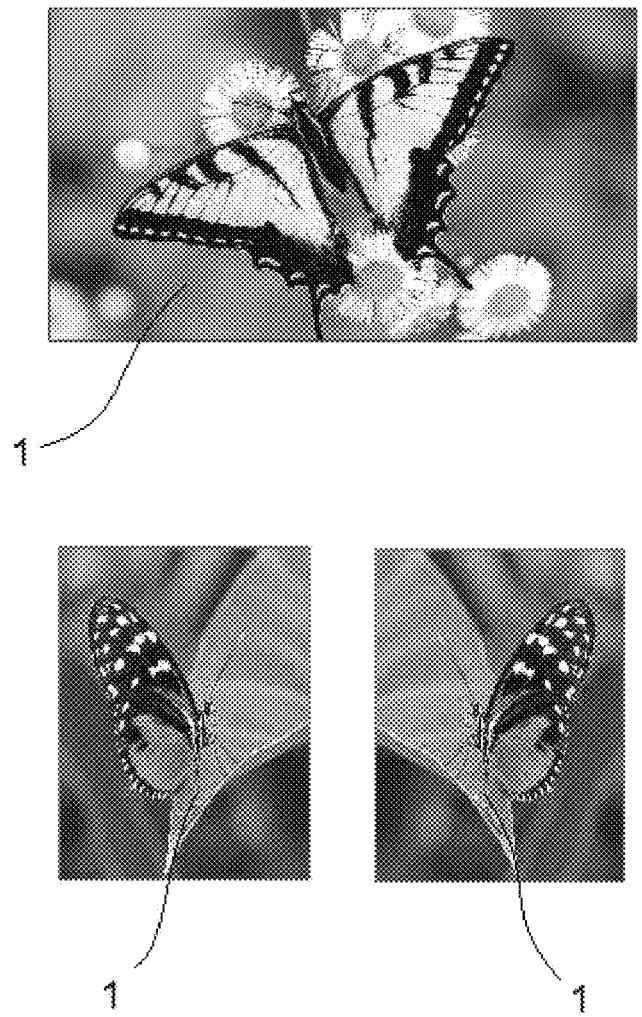
FIG. 2 depicts a grill hood decal and two grill door decals. The visually discernible aesthetic elements in this figure comprise photo-realistic scenes from nature.

The visually discernible aesthetic element 112 of the decal 1 may be comprised of any design or image, or multiple images, as desired. See FIG. 2. It may include graphical images or textual images or both. The images may comprise sports memorabilia images, nature scenes, abstract art, sporting images, camouflage, and lifestyle images, among others. However, the visually discernible aesthetic element 112 is not intended to merely convey information, such as instructions for the use of the grill 400 or warnings or warranty information or the like. The visually discernible aesthetic element 112 may be created using full color (CMYK) printing or other technologies known in the art. In the preferred embodiment the following types of ink are used: Latex Inks, Solvent Inks, UV Inks, Solvent UV Inks, Eco Solvent Inks, Screen Print Inks, and Dye Sublimation Inks.

In the embodiment where an adhesive is used, the adhesive may be silicone, acrylic, or a thermoset/elastomeric compound, or any other heat resistant and weather resistant adhesive suitable for bonding the decal 1 to the barbeque grill 400. In one variant of this embodiment the decal 1 further comprises a removable backing placed over the adhesive. The backing may be made of coated paper or any other suitable material that permits the backing to adhere to the adhesive and also to be removed from the adhesive. When in place the backing prevents the adhesive from adhering to a surface. When the backing is removed from the decal 1 the adhesive is exposed and the decal 1 can be placed onto the outer surface 410 of the barbeque grill 400 and affixed thereto.

The decal 1 may be die-cut to any desired shape and size. The shape of the decal 1 may be regular, such as square, rectangular, circular, oval, etc., or irregularly shaped, such as a cloud outline, a football helmet, or any other desired shape. The size of the decal 1 must be sufficient to cover at least ten percent of the outer surface 410 of the barbeque grill 400. In another embodiment the decal 1 must be able to cover at least twenty-five percent of the outer surface 410 of the barbeque grill 400, and in yet another embodiment the decal 1 must be able to cover at least fifty percent of the outer surface 410 of the barbeque grill 400.

In yet other embodiments, where the barbeque grill 400 has a hood 412, the decal 1 must be able to cover at least ten percent, twenty-five percent, or fifty percent of the outer surface 410 of the barbeque grill hood 412, respectively. In yet still other embodiments with a where the barbeque grill 400 has one or more doors 414, the decal 1 must be able to cover at least ten percent, twenty-five percent, or fifty percent of the outer surface 410 of each of the barbeque grill's doors 414, respectively. In yet still other embodiments, the minimum coverage area as described above can be achieved with a plurality of decals 1.

In one preferred embodiment the first surface 110 of the substrate 100 of the decal 1 comprises a printable opaque layer 114. See FIG. 4A. The visually discernible aesthetic element 112 is printed onto this opaque layer 114. This layer provides a medium for accepting the ink and for rendering the image sharp, whatever the substrate 100 of the decal 1. Typically, the printable opaque is white, to better set off the ink. Suppliers of the substrate 100 may provide various different configurations of the printable opaque layer.

In another preferred embodiment the decal 1 further comprises an over-laminate 200. See FIG. 4A. The over-laminate 200 is placed onto the first surface 110 of the substrate 100 over the visually discernible aesthetic element 112, and affixed thereto. The over-laminate 200 does not substantially obscure the visually discernible aesthetic element 112, is substantially flexible, and is resistant to environmental conditions, such as cold, rain, snow, ice, hail, ultraviolet radiation, cleaning solutions, and insect and bird excrement. Examples of suitable over-laminates 200 are clear film coatings, transparent protective barriers, and the like.

The decorative decal 1 as described above will not fail when exposed to the repeated heating and subsequent cooling of the barbeque grill 400 during normal operations, nor will it fail when exposed to environmental elements or cleaning regimens. That is, it will remain affixed to the barbeque grill and will experience no significant fading, cracking, peeling, or other blemishes during ordinary use over its intended lifespan.

In one embodiment of the present invention, the decorative decal 1 as described above is included in a complete consumer kit. In addition to the decal 1, the kit includes one or more grill inserts. Each grill insert is suitably adapted to replace the grill's 400 temperature gauge 418 and/or the manufacturer's name plate, thereby allowing for an unobstructed presentation of the decal 1 for a more aesthetically pleasing effect. The grill inserts are made of a heat resistant material, such as aluminum or stainless steel. They may be friction fit into the apertures left by the removal of the temperature gauge 418 and/or name plate, or they may be attached by the use of fasteners. Alternatively, they may comprise circumferential channels which engage with the interior edges of the apertures, thereby retaining the grill inserts in place. Heat resistant adhesives may also be used; in such case, the grill inserts may be placed over, rather than within, the apertures.

The consumer kit may also include a grill cleaning solution, such as alcohol, and a applicator for applying the grill cleaning solution. The applicator may be a brush, a sponge, a cloth, a spray bottle, or any other suitable device. The kit may also include a smoothing implement, used to ensure a smooth application of the decal 1 onto the grill 400. The smoothing implement is moved over the surface of the decal 1 once the decal 1 is applied to the grill 400, to smooth out any air bubbles that might have formed between the decal 1 and the grill surface 410. A decal cleaning solution may also be included, for removing environmental debris that accumulates on the decal 1 over time. An applicator for applying the decal cleaning solution, similar to the applicator for the grill cleaning solution as described above, may also be included in the kit. Finally, the kit may include a carrying pouch or other suitable container for conveniently retaining all of the kit elements together.

The present invention also contemplates a method of use of the decal 1 described herein. In its most basic form, the method comprises the following steps:

A. obtain a decorative decal 1 as described above; and

B. place the decorative decal 1 onto the outer surface 410 of the barbeque grill 400 such that the second surface 120 of the substrate 100 is in direct contact with the outer surface 410 of the barbeque grill 400, thereby retaining the decal 1 thereupon by "static cling".

In this embodiment, step A is performed before step B.

In one variation of this method, where the barbeque grill 400 comprises one or more handles 416, the following steps are performed:

A. obtain a decorative decal 1 as described above;

A2. remove the one or more handles 416 from the barbeque grill 400;

B. place the decorative decal 1 onto the outer surface 410 of the barbeque grill 400 such that the second surface 120 of the substrate 100 is in direct contact with the outer surface 410 of the barbeque grill 400, thereby retaining the decal 1 thereupon by "static cling"; and B2. re-attach the one or more handles 416 to the barbeque grill 400.

In this variation, step A is performed before step B, step A2 is performed in any order relative to step A and before step B, and step B2 is performed after step A, step A2, and step B.

In another variation of this method, where the barbeque grill 400 comprises a temperature gauge 418, the following steps are performed:

A. obtain a decorative decal 1 as described above;

A3. remove the temperature gauge 418 from the barbeque grill 400;

B. place the decorative decal 1 onto the outer surface 410 of the barbeque grill 400 such that the second surface 120 of the substrate 100 is in direct contact with the outer surface 410 of the barbeque grill 400, thereby retaining the decal 1 thereupon by "static cling"; and B3. re-attach the temperature gauge 418 to the barbeque grill 400.

In this variation, step A is performed before step B, step A3 is performed in any order relative to step A and before step B, and step B3 is performed after step A, step A3, and step B.

In yet another variation of this method, the following steps are performed:

A. obtain a decorative decal 1 as described above;

A1. clean the outer surface 410 of the barbeque grill 400 in preparation for applying the decorative decal 1 thereto; and B. place the decorative decal 1 onto the outer surface 410 of the barbeque grill 400 such that the second surface 120 of the substrate 100 is in direct contact with the outer surface 410 of the barbeque grill 400, thereby retaining the decal 1 thereupon by "static cling".

In this variation, step A is performed before step B, and step A1 is performed in any order relative to step A and before step B. An alcohol solution may be used to clean the outer surface 410 of the barbeque grill 400 in step A1, or other suitable solutions known in the art may be used.

In yet still another variation of this method, the following steps are performed:

A. obtain a decorative decal 1 as described above;

B. place the decorative decal 1 onto the outer surface 410 of the barbeque grill 400 such that the second surface 120 of the substrate 100 is in direct contact with the outer surface 410 of the barbeque grill 400, thereby retaining the decal 1 thereupon by "static cling".

In this variation, step A is performed before step B.

Figure 5:
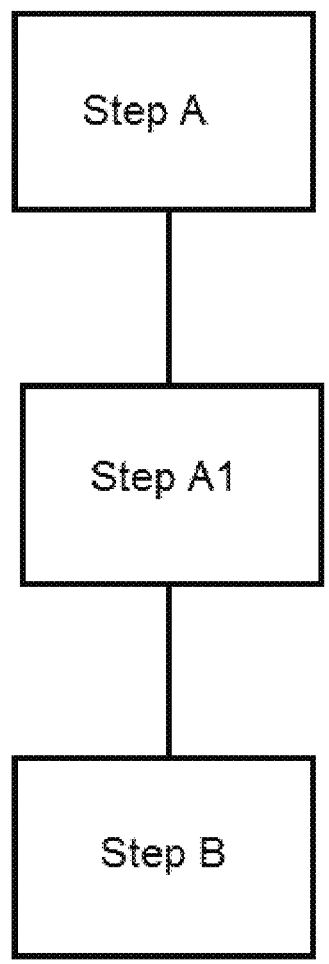
FIG. 5 is a flow chart depicting one embodiment of the method of use of the decal, whereby the grill hood is cleaned prior to the decal being placed onto the grill.
Figure 6:
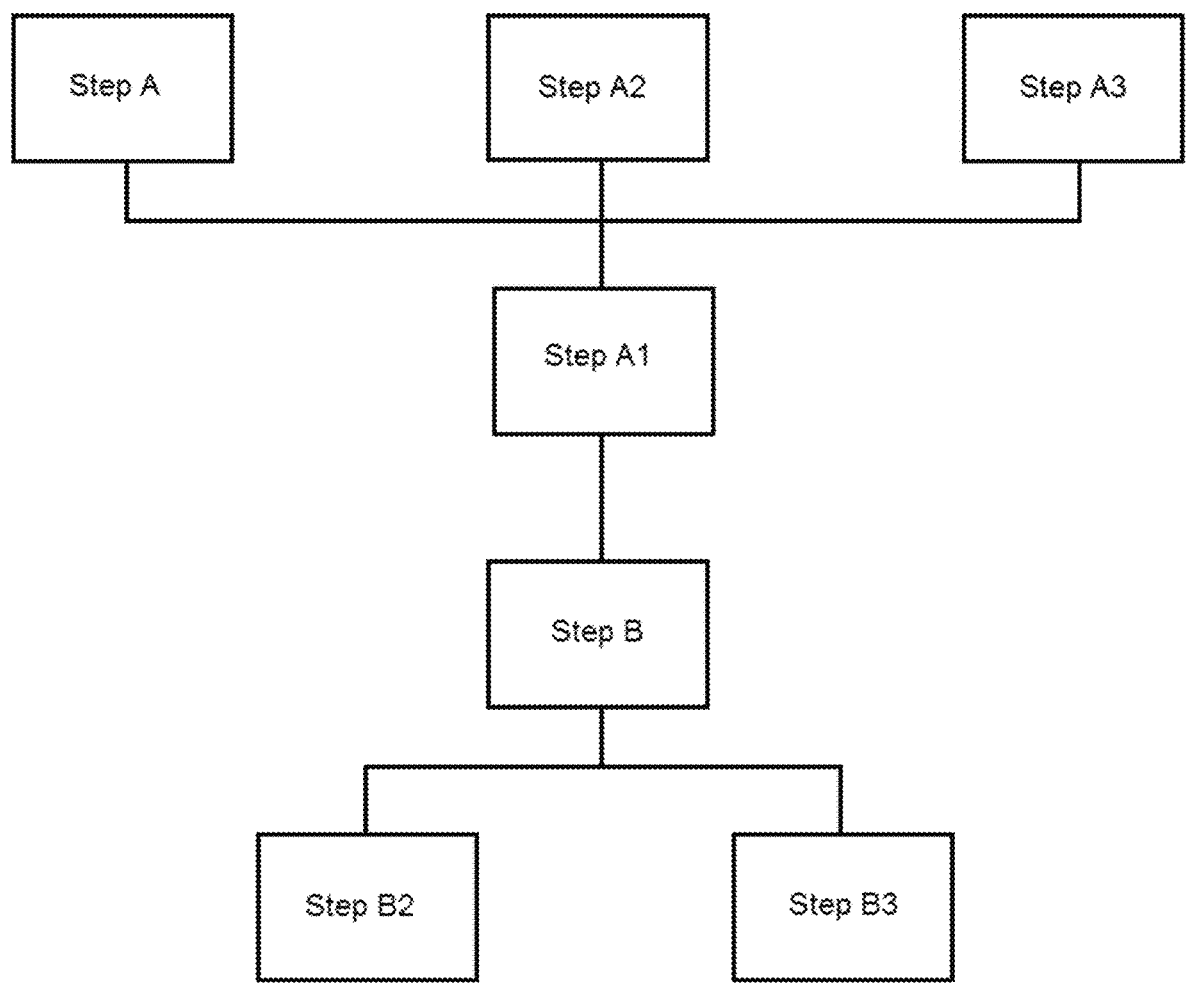
FIG. 6 is a flow chart depicting another embodiment of the method of use of the decal, whereby the grill handles and temperature gauge are removed from the grill, the grill hood is cleaned prior to the decal being placed onto the grill, then grill handles and temperature gauge are reattached to the grill after the decal is placed onto the grill.
Figure 7A:
FIGS. 7A through 7G depict the method disclosed in FIG. 6.
Figure 7B:
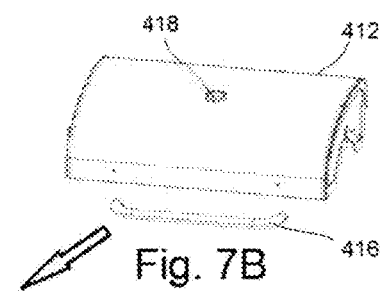
Figure 7C:
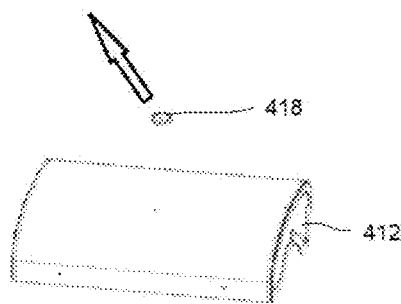
Figure 7D:
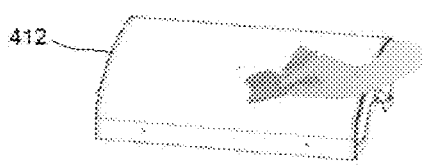
Figure 7E:
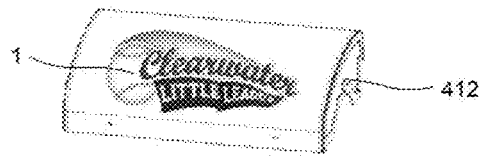
Figure 7F:
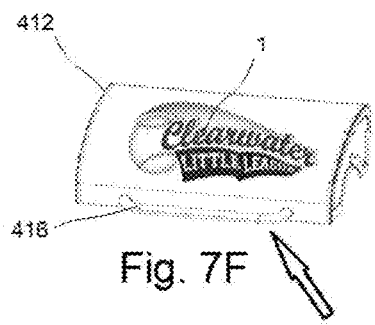
Figure 7G:
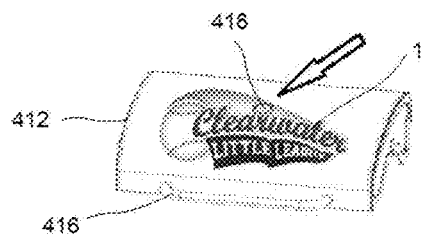

In yet still another variation of this method, the following steps are performed:

A. obtain a decorative decal 1 as described above;

A1. clean the outer surface 410 of the barbeque grill 400 in preparation for applying the decorative decal 1 thereto;

B. place the decorative decal 1 onto the outer surface 410 of the barbeque grill 400 such that the second surface 120 of the substrate 100 is in direct contact with the outer surface 410 of the barbeque grill 400, thereby retaining the decal 1 thereupon by "static cling". See FIG. 5.

In this variation, step A is performed before step B and step A1 is performed in any order relative to step A and before step B.

In yet still another variation of this method, where an adhesive is used and where the decal 1 incorporates a protective backing on the second surface 120 of the substrate 100, the following steps are performed:

A. obtain a decorative decal 1 as described above;

B1. remove the backing from the decal 1; and

B. place the decorative decal 1 onto the outer surface 410 of the barbeque grill 400 such that the adhesive is in contact with the outer surface 410 of the barbeque grill 400 and retains the decal 1 thereupon.

In this variation, step A is performed before step B, and step B1 is performed after step A and before step B.

In the preferred embodiment of the method, the following steps are performed:

A. obtain a decorative decal 1 as described above;

A1. clean the outer surface 410 of the barbeque grill 400 in preparation for applying the decorative decal 1 thereto;

A2. remove the one or more handles 416 from the barbeque grill 400;

A3. remove the temperature gauge 418 from the barbeque grill 400;

B. place the decorative decal 1 onto the outer surface 410 of the barbeque grill 400 such that the second surface 120 of the substrate 100 is in direct contact with the outer surface 410 of the barbeque grill 400, thereby retaining the decal 1 thereupon by "static cling";

B2. re-attach the one or more handles 416 to the barbeque grill 400; and B3. re-attach the temperature gauge 418 to the barbeque grill 400.

In this embodiment, step A is performed before step B, step A1 is performed in any order relative to step A and before step B, step A2 is performed in any order relative to step A and before step B, step A3 is performed in any order relative to step A and before step B, step B2 is performed in any order relative to step B3, and steps B2 and B3 are performed after steps A, A2, A3, and B. See FIGS. 6 and 7A through 7H.

In embodiments of the method where the barbeque grill 400 comprises a hood 412, the decorative decal 1 may be placed onto the outer surface 410 of the grill's hood 412 in step B. In embodiments of the method where the barbeque grill 400 comprises one or more doors 414, the decorative decal 1 may be placed onto the outer surface 410 of the grill's one or more doors 414 in step B.

In any of the embodiments and variants of the method described above, a plurality of decorative decals 1 may be used. In such case, step A is repeated for each of the decals 1 and step B is repeated for each of the decals 1. Each iteration step A is performed before each iteration of step B.

What has been described and illustrated herein is a preferred embodiment of the decorative decal 1 and the method of use of the present invention, along with some it its variations. The terms, descriptions, and figures used herein are set forth by way of illustration only and are not meant as limitations. Those skilled in the art will recognize that many variations are possible within the spirit and scope of the invention in which all terms are meant in their broadest, reasonable sense unless otherwise indicated. Other embodiments not specifically set forth herein are therefore also within the scope of the following claims.

I claim:

1. A decorative decal for altering the aesthetics of a barbeque grill, said decorative decal comprising
   a substrate,
     said substrate being substantially flexible and resistant to heat up to at least 200 degrees Fahrenheit,
     said substrate comprising a core having a first surface and a second surface,
       with said first surface having a visually discernible aesthetic element layered thereon, and
       said second surface being smooth and non-porous, such that when said second surface is placed directly onto a portion of an outer surface of the barbeque grill cohesive forces between the smooth non-porous second surface of the decorative decal and said portion of the outer surface of the barbeque grill cause said decorative decal to cling to said portion of the outer surface of the barbeque grill,
   whereby said decorative decal is suitably configured to be placed onto said outer surface of the barbeque grill such that the second surface of the core of the substrate is in direct contact with said outer surface of the barbeque grill and the decorative decal is retained thereupon.

2. The decorative decal of claim 1 wherein the core of the substrate is comprised of one of the group of polyimide, vinyl, polytetrafluorethylene (PTFE), and flexible aluminum sheeting.

3. The decorative decal of claim 1 further comprising an over-laminate, said over-laminate being placed onto the first surface of the core of the substrate over the visually discernible aesthetic element and affixed thereto,
   whereby said over-laminate does not substantially obscure the visually discernible aesthetic element and the over-laminate is resistant to cold, rain, snow, ice, hail, ultraviolet radiation, cleaning solutions, and insect and bird excrement.

4. The decorative decal of claim 1 wherein the visually discernible aesthetic element is created using full color printing.

5. The decorative decal of claim 1 wherein the visually discernible aesthetic element comprises graphic images.

6. The decorative decal of claim 1 wherein the visually discernible aesthetic element comprises text.

7. The decorative decal of claim 1 further wherein the first surface of the core of the substrate has layered thereon a printable opaque layer, whereby the visually discernible aesthetic element is printed onto said layer.

8. The decorative decal of claim 1 wherein the decorative decal is die-cut to the desired size and shape.

9. The decorative decal of claim 1 wherein the decorative decal is irregularly shaped.

10. The decorative decal of claim 1 wherein the decorative decal may be combined with one or more additional decorative decals all having the same characteristics as said decorative decal.

11. The decorative decal of claim 1 wherein the substrate is resistant to heat up to at least 500 degrees Fahrenheit.

12. The decorative decal of claim 1 wherein the visually discernible aesthetic element comprises one or more images from the one of the group of sports memorabilia images, nature scenes, abstract art, sporting images, camouflage, and lifestyle images.

13. The decorative decal of claim 1 wherein the barbeque grill comprises a hood, and the decorative decal is placed onto a portion of an outer surface of the barbeque grill hood.

14. The decorative decal of claim 1 wherein the barbeque grill comprises a door, and the decorative decal is placed onto a portion of an outer surface of the barbeque grill door.

15. The decorative decal of claim 1 further comprising an over-laminate;
   wherein
     the core of the substrate is constructed out of one of the group of polyimide, vinyl, polytetrafluoroethylene (PTFE), and aluminum;
     the first surface of the core of the substrate has placed thereon a printable opaque layer, whereby the visually discernible aesthetic element is printed onto said layer using full color printing;

the over-laminate is placed over the printable layer and affixed thereto and does not substantially obscure the visually discernible aesthetic element;

the over-laminate is resistant to cold, rain, snow, ice, hail, ultraviolet radiation, cleaning solutions, and insect and bird excrement; and the decorative decal is die-cut to the desired size and shape to cover at least a portion of the outer surface of the barbeque grill.

* * * * *